(12) United States Patent
Cai

(10) Patent No.: US 7,657,283 B2
(45) Date of Patent: Feb. 2, 2010

(54) SYSTEM AND METHOD FOR MEASURING AND CONFIGURING MISS-CONFIGURED 2G NEIGHBORS IN 3G NETWORKS

(75) Inventor: Jianyong Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 566 days.

(21) Appl. No.: 11/601,339

(22) Filed: Nov. 17, 2006

(65) Prior Publication Data
US 2007/0127398 A1    Jun. 7, 2007

(30) Foreign Application Priority Data
Nov. 18, 2005    (CN)    ............ 2005 1 0123658

(51) Int. Cl.
H04B 17/00    (2006.01)
H04W 4/00    (2009.01)
H04W 36/00    (2009.01)
H04M 1/00    (2006.01)
H04B 1/38    (2006.01)

(52) U.S. Cl. .............. 455/552.1; 455/67.11; 455/422.1; 455/436; 455/550.1; 455/561

(58) Field of Classification Search ......... 370/254–255, 370/277, 310, 328–333, 338, 341; 455/67.11, 455/418–420, 422.1, 423–425, 432.1–432.3, 455/436–451, 452.1–452.2, 509, 513–514, 455/524–526, 550.1, 552.1, 556.2, 560–561, 455/63.1, 68–69, 88, 434, 456.1, 456.5–456.6, 455/466, 517, 557
See application file for complete search history.

(56) References Cited

U.S. PATENT DOCUMENTS

| | | | |
|---|---|---|---|
| 6,804,519 B1 * | 10/2004 | Czaja et al. ............. | 455/442 |
| 7,313,116 B2 * | 12/2007 | Lee et al. ............. | 370/335 |
| 7,409,214 B2 * | 8/2008 | Lee .................. | 455/436 |
| 7,535,846 B2 * | 5/2009 | Kim et al. ............ | 370/241 |
| 2004/0092259 A1 | 5/2004 | Blanc et al. | |
| 2005/0148348 A1 * | 7/2005 | Cramby et al. ......... | 455/458 |
| 2005/0288017 A1 * | 12/2005 | Doumenc et al. ....... | 455/435.3 |

FOREIGN PATENT DOCUMENTS

| | | |
|---|---|---|
| CN | 1502213 | 6/2004 |
| EP | 1215928 | 6/2002 |
| GB | 2392347 | 2/2004 |
| JP | 2002-330096 A | 11/2002 |
| JP | 2004-522348 A | 7/2004 |
| WO | WO2004/016024 | 2/2004 |

\* cited by examiner

Primary Examiner—Meless N Zewdu
(74) Attorney, Agent, or Firm—Finnegan, Henderson, Farabow, Garrett & Dunner, LLP

(57) ABSTRACT

A system and a method for measuring and configuring miss-configured 2G neighbors in a 3G network. The system comprises a user equipment, an operation and maintenance center, a radio network controller and a data register, wherein the operation and maintenance center further comprises a measurement information unit and a configuration unit, and the radio network controller further comprises a measurement control unit. The method comprises the steps of: setting parameters and measuring 2G neighbors in a 3G cell according to the parameters; generating a to-be-measured 2G neighbor list and delivering the to-be-measured 2G neighbor list to the user equipment for measuring; receiving report of measurement information of the 2G neighbors from the user equipment, and if the reported measurement information of one of the to-be-measured 2G neighbors meets condition of miss-configuration, adding the one to the miss-configured 2G neighbor list.

25 Claims, 2 Drawing Sheets

SYSTEM AND METHOD FOR MEASURING AND CONFIGURING MISS-CONFIGURED 2G NEIGHBORS IN 3G NETWORKS

FIELD OF THE INVENTION

The present invention relates to the field of wireless communications, particularly to a system and a method for measuring and configuring miss-configured 2G neighbors in 3G networks.

BACKGROUND OF THE INVENTION

In a 3G system, roaming handovers are an important part in mobility management. Due to mobility of the multimode user equipment (UE), its connection service is handed over from one cell to another so that the network can ensure users good service, reduce call-drop rate, improve speech quality and reduce network congestion.

When in connection mode, the multimode user equipment leaves a wireless access system and enters into another wireless access system, during the course of handover, user service is still maintained, and this process is referred to as intersystem handovers. When in other modes other than connection, the multimode user equipment leaves a wireless access system for another, roaming process happens. Then the multimode user equipment can gain access to a new system for service at a new place. The aim for intersystem handovers is to provide mobile subscribers better quality of service at bordering areas between different systems.

Because the present networks are mainly 2G networks, which can not be possibly updated to 3G networks all at once, 3G networks and 2G networks will certainly coexist for a rather long period. Therefore, it is very important to realize the function of roaming handovers between 3G networks and 2G networks.

When 3G networks become poor in coverage, if there is good 2G coverage in this area, 3G networks will control the multimode user equipment and order it to start measuring 2G networks. If 2G networks' quality meets the requirement, the multimode user equipment will send corresponding measurement reports to 3G networks which, after judging the reports, will initiate a handover to 2G networks, thus maintaining the conversation process.

In connection mode, when 3G networks control the multimode user equipment and order it to measure 2G networks' signals, the 2G network neighbor lists need to be delivered to the multimode user equipment. If the 2G network neighbor lists are not configured, or the target 2G cell's neighbors are not configured in the lists, the multimode user equipment cannot implement the handover, thus causing a call-drop. Whereas in idle mode, the multimode user equipment will reselect a 2G system based on the system-delivered 2G neighbor lists. If 2G networks' quality meets the requirement, the multimode user equipment will reselect 2G networks.

From the above explanations, whether the multimode user equipment is in connection mode or in idle mode, it needs to use the 2G neighbor lists to finish the handover or reselection.

In connection mode, if the 2G neighbor lists are miss-configured, when 3G coverage becomes poor, it can cause poor speech quality, discontinuity of conversation at the same time and maybe call dropping in serious conditions.

In idle mode, if the 2G neighbor lists are miss-configured, when 3G coverage becomes poor, it can cause network dropping, after which the multimode user equipment needs to spend a long time searching cells, meanwhile it cannot make or receive calls, which will seriously affect users' feelings.

Generally speaking, when a 3G network is formally put into operation, the system has already been configured with initial 2G neighbor lists, which may not be complete and need continuous optimization in future operation stage of the network. Through optimizing the 2G neighbor lists, it can improve the quality of handovers and reselections between 3G networks and 2G networks. The following method is commonly used for optimizing the lists of 3G and 2G neighbors:

1) analyzing users' complaints, and determining accordingly whether they are caused by handovers or reselections between 3G and 2G networks, and arranging specified tests;

2) analyzing certain cells' performance counter, examining the handover success rate index, and seeing if the indexes are very poor, if so, arranging specified tests for these cells;

3) based on the above analyses, for the problematic areas and key-coverage areas, for example, indoor coverage areas, arranging channel tests and call quality test (CQT), and arranging special channel testing personnel to test and analyze testing data;

4) analyzing channel testing data or CQT testing data, analyzing the handover success rate between 3G and 2G networks, and confirming whether they are caused by the miss-configuring of 2G neighbors;

5) adding more 2G neighbors, and carrying out further tests to make sure problems are solved.

The prior art finds miss-configured 2G neighbors all by post-analyses, and before successfully solving the problem of the miss-configured 2G neighbors, many users possibly have already experienced poor network quality, which affects their feelings and damages the reputation of the network operator.

With the prior art, special channel tests and CQT tests are needed to find and solve the problem of miss-configured neighbors, which involves a great deal of manpower and resources as well as investments.

When the equipment and maintenance of 2G networks are different from that of 3G networks, the maintenance personnel of the 3G networks may not be informed duly of the adjustment of the 2G networks, for example, when the 2G networks adjust their antennas, add more sites or repeaters, the handovers between 3G and 2G networks and the relations between neighbors will change, which, without timely adjusting of the relations between neighbors, will affect speech quality and further users' final feelings.

When 3G networks are adjusted alone, the neighbor configuration relations between 3G and 2G networks experience changes too. The common method is to find problems by channel tests. However, channel tests cannot traverse all the channels and solve all the miss-configurations of neighbors; therefore, neighbor optimization has to be resorted to after some operation time of the network.

SUMMARY OF THE INVENTION

Embodiments of the present invention aim to provide a system and a method for measuring and configuring miss-configured 2G neighbors in a 3G network, enabling automatic configuration of a multimode user equipment in neighbors of 3G and 2G networks, optimizing neighbor information of the multimode user equipment, smoothing network handovers and bettering users' experiences.

The embodiments of the present invention provide a system for measuring and configuring a miss-configured 2G neighbor to a user equipment in a 3G network, including: an operation and maintenance center, a radio network controller and a data register, wherein the operation and maintenance center further includes a measurement information unit, which stores measurement and configuration parameters as well as measurement condition for 2G neighbors in the operation and maintenance center, and forms list of a 3G cell and to-be-measured 2G neighbors based on the parameters; a configuration unit, which, after information of the to-be-measured 2G neighbors of the 3G cell is delivered to the user equipment for measuring, receives report of measurement information of the to-be-measured 2G neighbors from the user equipment, analyzes the report of the measurement information of the to-be-measured 2G neighbors, determines whether one of the to-be-measured 2G neighbors meets condition of miss-configuration or not, and if yes, adds the one to the miss-configured 2G neighbor list; the radio network controller further includes a measurement control unit, wherein when the measurement condition is met, the operation and maintenance center delivers, via the measurement control unit, the to-be-measured 2G neighbor list to the user equipment for measuring and reporting to the configuration unit according to the requirement of the measurement control unit; the data register records the report of the measurement information of the to-be-measured 2G neighbor.

The embodiments of the present invention also provide a method for measuring and configuring a miss-configured 2G neighbor to a user equipment in a 3G network, including the following steps: setting parameters and measuring 2G neighbors in a 3G cell according to the parameters; generating a to-be-measured 2G neighbor list and delivering the to-be-measured 2G neighbor list to the user equipment for measuring; receiving report of measurement information of the 2G neighbors from the user equipment, and if the reported measurement information of one of the to-be-measured 2G neighbors meets condition of miss-configuration, adding the one to the miss-configured 2G neighbor list.

According to the embodiments of the present invention, when the user equipment goes from a 3G coverage area into a 2G coverage area, the system can send measurement control to the user equipment so that it starts measuring the cell. Through configuring the measurement control, the system analyzes and discovers the problem of miss-configured 2G neighbors, offers suggestions on configuration of neighbors, thus reducing degradation of speech quality and call dropping due to miss-configuration of 2G neighbors and improving optimization efficiency of neighbors.

DETAILED DESCRIPTION OF THE EMBODIMENTS

In connection with FIGS. 1 and 2, below is the detailed description of a method for automatically measuring and configuring miss-configured 2G neighbors in a 3G network according to the embodiments of the present invention.

The embodiments of the present invention describe a method for automatically measuring and configuring miss-configured neighbors of a bi-mode or multimode wireless user equipment which supports the second generation (2G) of wireless mobile communication technology, i.e. Global System for Mobile communication (GSM), and the third generation (3G) of wireless mobile communication technology, i.e., Wideband Code Division Multiple Access (WCDMA). However, besides the above mobile communication networks, the embodiment of the present invention also applies to any other coexisting bi-mode or multimode mobile communication systems.

WCDMA protocol defines that the radio network controller in WCDMA system can deliver measurement control message so that the multimode user equipment in a WCDMA cell starts measuring GSM signals. It also defines the condition for the multimode user equipment to report GSM signals. The GSM signals meeting such condition will be reported to the operation and maintenance center either periodically or by event. Neighbor lists showing neighbors which can handover to GSM will be generated to enable the multimode user equipment to perform intersystem handover between WCDMA and GSM systems. Moreover, the protocol also defines that neighbor lists, which are measured by the multimode user equipment and show neighbors which can handover to GSM, can reach as many as 32.

However, generally GSM neighbor lists configured for a CDMA cell are fewer than 32. That is to say, additional GSM neighbor lists can be added to them to make the number of neighbor lists showing neighbors which can handover to GSM reach 32.

The embodiments of the present invention provide a system and a method, which relate to the following aspects: measuring all those GSM cells that don't appear on the GSM neighbor lists in a WCDMA cell, making those GSM cells that reach the GSM neighbor list threshold in a WCDMA cell into miss-configured GSM neighbor lists in this WCDMA cell, adding them to GSM neighbor lists in the WCDMA cell, increasing configuration of the miss-configured GSM neighbor lists so as to realize the measurement of GSM (a different system from WCDMA) neighbor signals in a WCDMA cell, analyzing the measurement results, obtaining the miss-configured GSM neighbor lists and then optimizing their configuration.

Figure 1:
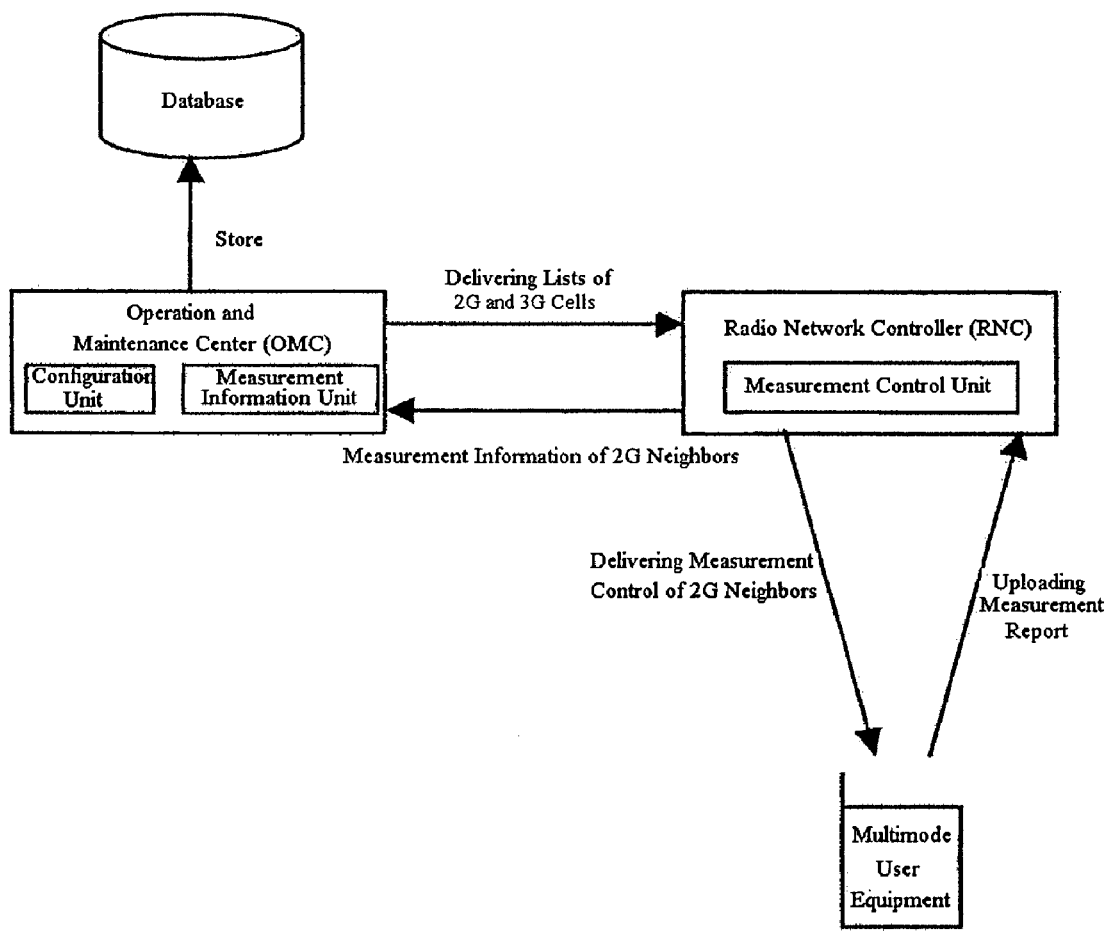
FIG. 1 is a schematic diagram illustrating the system for measuring and configuring miss-configured 2G neighbors in a 3G network according to the embodiment of the present invention.

As shown in FIG. 1, in this embodiment, the system for measuring and configuring a miss-configured GSM neighbor to a multimode user equipment in a WCDMA network includes: an operation and maintenance center (OMC); a radio network controller (RNC); a database.

The operation and maintenance center (OMC) includes: a measurement information unit, used to store parameters for configuring and optimizing GSM neighbors as well as conditions for measuring GSM neighbors in the operation and maintenance center, and form lists of a WCDMA cell and to-be-measured 2G neighbors based on the parameters; a configuration unit, wherein after the information of the to-be-measured GSM neighbors in the WCDMA cell is all delivered to the multimode user equipment and the delivery times have reached Nrepeat, then after measuring, the multimode user equipment reports the measurement information of the to-be-measured GSM neighbors to the configuration unit, the configuration unit or the database records the reports of measurement information of the to-be-measured GSM neighbors, the configuration unit analyzes all reports of measurement information of the to-be-measured GSM neighbors and determines whether they meet conditions of miss-configuration and if so, adds them as the miss-configured GSM neighbor lists.

The radio network controller includes a measurement control unit, through which, if measurement condition is met, the operation and maintenance center delivers the to-be-measured GSM neighbor lists to the multimode user equipment. After measuring them, the multimode user equipment reports them according to the requirement of the measurement control unit. That is, the measurement control unit will give the triggering mode for reporting 2G neighbor signals, for example, periodic report or event report. For event report, the measurement control unit sets the threshold requirement for 2G cells, for example, the signal level should be higher than −100 dBm and hold the duration time. For periodic report, a periodic time will be given.

In connection with the system for measuring and configuring miss-configured GSM neighbors in a WCDMA network according to the embodiment of the present invention, the method thereof is further detailed as follows.

To facilitate the following description, the following definitions are given particularly:

Definition 1: GSM_Cell_Set, a set of combinations of BCCH frequency points and BSIC numbers in all the GSM cells in the to-be-measured area, that is GSM_Cell_Set={(BCCH_Arfcn1,Bsic1), (BCCH_Arfcn2,Bsic2), . . . (BCCH_ArfcnN, BsicN)};

Definition 2: WCDMA_Cell_Set, a set of IDs of all the WCDMA cells in the to-be-measured area, that is, WCDMA_Cell_Set={Cellid1, Cellid2, . . . CellidM};

Definition 3: GSM_Neighbor_List_i, the GSM neighbor lists having been configured for the i-th WCDMA cell Cellidi (i=1, 2, . . . M);

Definition 4: GSM_Neighbor_Add_List_i_j, the j-th to-be-measured GSM neighbor list in the i-th WCDMA cell Cellidi;

Definition 5: GSM_Neighbor_Set, the to-be-measured GSM neighbor queue constituted by GSM_Neighbor_List_i and GSM_Neighbor_Add_List_i_j, that is, GSM_Neighbor_Set=GSM_Neighbor_list_i+GSM_Neighbor_Add_List_i_j, wherein GSM_Neighbor_Add_List_i_j is a to-be-measured GSM neighbor list formed by selecting, according to the selection and measurement algorithm of the to-be-measured GSM neighbors, (32−K) GSM neighbor lists different from any other GSM neighbor lists in GSM_Neighbor_list_i from GSM_Cell_Set.

Figure 2:
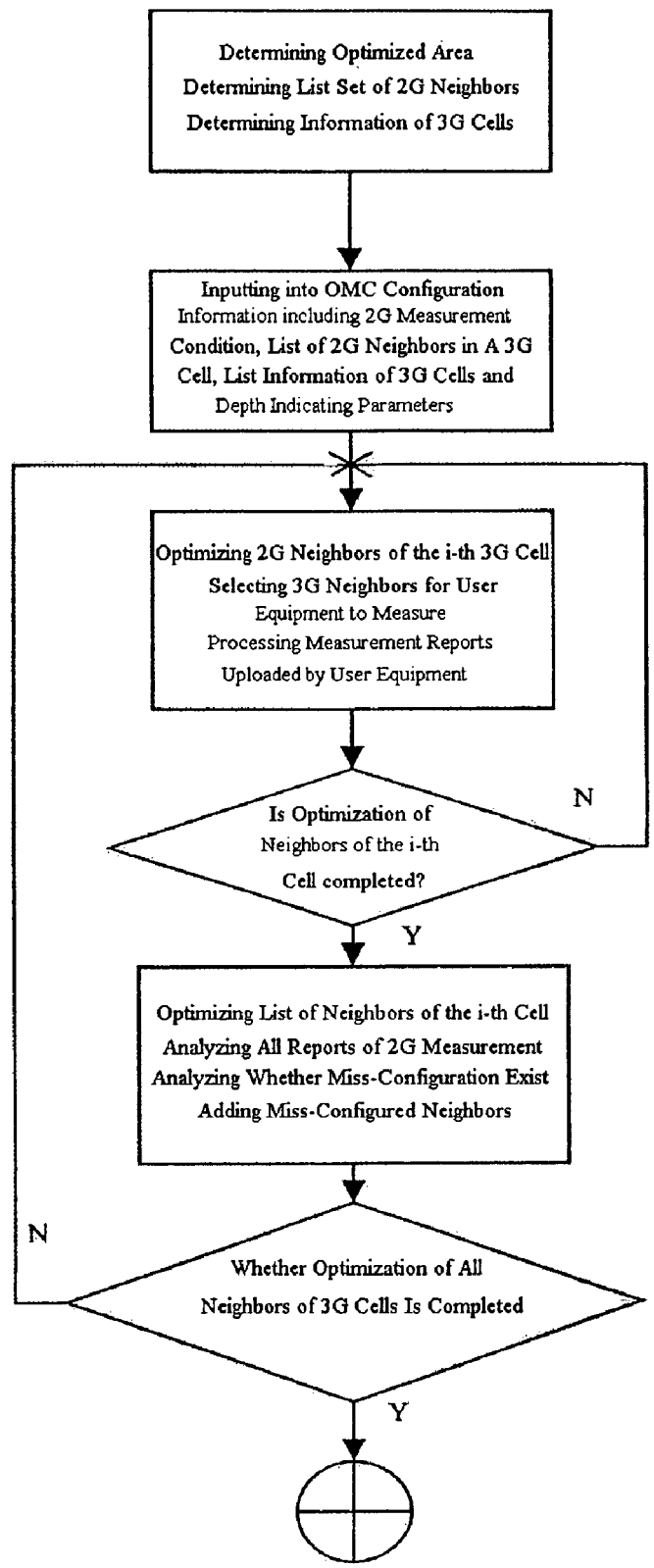
FIG. 2 is a flow chart illustrating the method for measuring and configuring miss-configured 2G neighbors in a 3G network according to the embodiment of the present invention.

As shown in FIG. 2, the method for measuring and configuring miss-configured GSM neighbors in a WCDMA network includes the following steps:

Step (I): determining the area of WCDMA cells and 2G neighbors in the WCDMA network that needs to be measured and configured:

acquiring information of all the WCDMA cells in the area, i.e. WCDMA_Cell_Set;

according to the area wherein GSM neighbor lists need to be measured and configured in WCDMA network cells, determining information of all the GSM cells in the area, i.e. GSM_Cell_Set.

The area mentioned above whose GSM neighbors need to be measured and configured can be a specific WCDMA cell, or a certain geographic area, or a certain administrative area.

Step (II): setting, by the measurement information unit in the operation and maintenance center, parameters for measuring and configuring GSM neighbors in a WCDMA network:

(1) setting the information needed for the multimode user equipment to start measuring GSM neighbors in a WCDNA network:

In present embodiment, in a WCDMA cell, the information in table 1 is needed for the multimode user equipment to start measuring GSM neighbors.

TABLE 1

The configuration information for measuring GSM neighbors in a WCDMA network

| Cell Name | Value Range | Meaning |
|---|---|---|
| BSIC | | Base Station Identity Code |
| >NCC | Bit String (3) | Network Identity and Color Code |
| >BCC | Bit String (3) | Base Station Identity and Color Code |
| >BCCH ARFCN | Integer (0, . . . , 1023) | BCCH Frequency Point Number |

In the information of GSM neighbors, the number of BCCH frequency points can reach at most 1024, and each BCCH frequency point can be configured with different base station identity code (BSIC). However, in real systems, a certain network operator only uses part of the BCCH frequency points; for example, China Mobile uses 890-909/935-954 MHz in GSM900 frequency range with the corresponding BCCH frequency point number (BCCH ARFCN) of 1-95; it also uses 1710-1720 MHz in DCS1800 frequency range with the corresponding BCCH frequency point number of 512-561; altogether there are 145 carrier frequencies. Therefore, all GSM neighbors (not taking frequency multiplexing into account) can reach 145×8=1160 at the most.

If the prior art is used to measure frequency points, since a multimode user equipment can only measure as many as 32 miss-configured neighbors at one time, it will require a plurality of multimode user equipments and a long time to finish measuring 1160 frequency points.

Therefore, in the present embodiment, to reduce the number of potential miss-configured GSM neighbors, before measuring and configuring miss-configured GSM neighbors, firstly, it is required to determine the area that needs measuring and configuring its miss-configured neighbors, and acquire BCCH frequency points and BSIC of the GSM cells and their neighboring cells within this area. This can be a conditional configuration process, i.e., manual configuration process. For example, to acquire and optimize GSM neighbors within an area, it is required to firstly define the corresponding area, then acquire information of all the GSM cells in this area, including BCCH frequency points and BSIC, then form a queue as input parameter lists GSM_Cell_Set for measuring and configuring miss-configured neighbors. That is, BCCH frequency points and BSIC are combined, for instance, Combination (1, 1) for BCCH frequency point 1 and BSIC 1, Combination (2, 2) for BCCH frequency point 2 and BSIC 2. Then all combinations of the BCCH frequency points and BSIC in this area form GSM_Cell_Set, an input parameter list set for measuring and configuring miss-configured neighbors.

(2) setting depth indicating parameter Nrepeat for measurement and configuration:

By setting depth indicating parameter Nrepeat for measurement and configuration, the system determines the times for the measurement control unit to repeatedly deliver to-be-measured GSM neighbors so that all the information of GSM cells in the i-th cell Cellidi in WCDMA is delivered to the multimode user equipment.

The to-be-measured GSM neighbors delivered to the multimode user equipment can not exceed 32 each time, while there are more than 32 GSM cells. Therefore, after subtracting K GSM neighbors from all GSM cells, each time only (32−K) GSM cells can be selected and delivered and after that, these (32−K) cells will be moved to the end of the queue. If all the GSM cells are traversed and successfully delivered to the multimode user equipment for measuring, add 1 to the delivery times of GSM cells in the WCDMA cell. When the delivery times reach Nrepeat, that is, the delivery process has repeated N times, it is a proof that all the GSM cells have been measured.

The repeated delivery times Nrepeat is different for a different multimode user equipment.

For example, there are 100 pieces of GSM cell information in a WCDMA cell, if the multimode user equipment has been configured with 10 neighbor lists in this cell, then from the rest 90 pieces of GSM cell information, 32−10=22 pieces of GSM cell information can be selected for delivery each time. To avoid repeated delivery, after 22 pieces of cell information are delivered the first time, they will be moved to the end of the queue, and the next different 22 pieces of cell information will be selected for delivery. This process will be repeated 4 times and altogether 88 pieces of cell information are delivered with 2 pieces of cell information remaining. When all the GSM cells are traversed, add 1 to delivery times. If delivery times reach depth indicating parameter Nrepeat, it is proof that all the GSM cells have been measured.

(3) setting list information (WCDMA_Cell_Set) of WCDMA cells (Cellidi) that need measuring and configuring their GSM neighbors:

By setting list information (WCDMA_Cell_Set) of WCDMA cells that need measuring and configuring their GSM neighbors, the number of WCDMA cells (Cellidi) that need measuring and configuring their GSM neighbors is determined.

(4) setting conditions for the multimode user equipment to measure GSM neighbors:

A user should meet the condition for measuring GSM neighbors. The condition here can mean that while moving, the multimode user equipment needs to handover to GSM and start measuring GSM neighbors, or that the network side initiates the measurement of GSM cells to the multimode user equipment in order to measure and configure GSM neighbors.

In the present embodiment, the condition for the multimode user equipment to measure GSM neighbors is that the level of GSM is greater than the minimum level of GSM (GSM_RSSImin).

Step (III): calling the measurement control unit in the radio network controller to start measuring GSM neighbor lists for each WCDMA cell (Cellidi):

For the i-th cell Cellidi in WCDMA_Cell_Set, all the multimode user equipments in the cell are observed and if a certain multimode user equipment j is at the edge of WCDMA network and needs to measure GSM neighbors, the radio network controller requires the multimode user equipment to start measuring GSM cells.

Step (IV): The measurement control unit generating the to-be-measured neighbor lists, and delivering them to the multimode user equipment:

According to the WCDMA cell Cellidi where the current multimode user equipment resides, the radio network controller acquires the GSM neighbor list GSM_Neighbor_List_i of this cell and collects them as the GSM neighbor list set of the multimode user equipment. If in the set there are K lists, and K is no smaller than 32, then finish the measurement and configuration process; otherwise, according to the selection and measurement algorithm for the to-be-measured GSM neighbors, from the GSM_Cell_Set, (32−K) GSM cells different from any other cell in GSM_Neighbor_List_i are selected as the to-be-measured GSM neighbor lists, i.e., GSM_Neighbor_Add_List_i_j. GSM_Neighbor_List_i and GSM_Neighbor_Add_List_i_j together form a queue of 32 to-be-measured GSM neighbor lists, i.e., GSM_Neighbor_Set, which, together with corresponding condition for measurement, will be directly delivered, via the measurement control unit, to the multimode user equipment for measuring.

The selection and measurement algorithm for the to-be-measured GSM neighbors GSM_Neighbor_Add_List_i_j includes the following steps:

(1): compare the cell information in GSM_Cell_Set with the neighbor information in GSM_Neighbor_List_i; in GSM_Cell_Set, exclude GSM neighbor information in GSM_Neighbor_List_i and constitute the queue of to-be-measured GSM neighbor lists of the i-th cell Celidi in WCDMA_Cell_Set;

(2): when a multimode user equipment in this cell needs to start measuring GSM, the first (32−K) to-be-measured neighbor lists will be selected from head of the queue; to ensure that the selected to-be-measured GSM neighbors are not repeatedly delivered neighbors, after these (32−K) to-be-measured neighbors are delivered, they are moved to the end of the queue; once these (32−K) to-be-measured neighbors are delivered successfully to the multimode user equipment for measurement, add 1 to the delivery times of GSM neighbors in the i-th cell Cellidi in WCDMA_Cell_Set;

(3) repeat step (2) until the delivery times of GSM cells reach Nrepeat, then finish delivering the to-be-measured GSM neighbor lists of the i-th cell Cellidi in WCDMA_Cell_Set.

Step (V): the multimode user equipment measuring and reporting information of GSM neighbors to the configuration unit, which processes the information of GSM neighbors:

Based on the measurement control delivered by the measurement control units in the radio network controller, the multimode user equipment starts measuring signals of the to-be-measured GSM neighbors, and reports to the radio network controller according to the requirement of the measurement control. The radio network controller processes the reports, for example, filters off the reports on the 2G cells which have been configured as neighbors, and forwards the reports to the configuration unit in the operation and maintenance center. After receiving the reports from the multimode user equipment, the configuration unit in the operation and maintenance center records the measurement reports if the recording condition is met.

The condition for recording is that if the included GSM neighbors are not in GSM_Neighbor_List_i of the present cell, the radio network controller records the information of the Cellidi where the multimode user equipment currently resides and of the reported GSM neighbors (i.e., BCCH frequency point number and BSIC information) as well as signal quality of the GSM cell, and reports them to the configuration unit in the operation and maintenance center (OMC); otherwise, no action is needed.

Step (VI): the configuration unit configuring automatically miss-configured GSM neighbors in the WCDMA cell:

According to the requirement in step (III), if the information of the to-be-measured neighbors in a cell is completely delivered to the multimode user equipment and the delivery times has reached Nrepeat, the measurement control unit in the radio network controller will inform the configuration unit in the operation and maintenance center (OMC) that the information delivery of the cell's neighbors has finished. The configuration unit collects all the reported information of the to-be-measured GSM neighbors; if the signal quality of a certain to-be-measured GSM neighbor exceeds a preset threshold, for example, the signal level of GSM is greater than −100 dBm, and the reporting times also exceeds a preset threshold, for example, the reporting times of a certain 2G cell exceeds 10 times. Then it proves that the to-be-measured GSM neighbor is a miss-configured neighbor and it will be added to GSM neighbor lists in the WCDMA cell.

GSM neighbors are added to a WCDMA cell either automatically by the operation and maintenance center or conditionally, that is, selectively by hand.

Step (VII): repeating step (I) to step (VI), traversing all WCDMA cells and measuring and configuring GSM neighbors for them and then finishing measuring and configuring the miss-configured GSM neighbors in the WCDMA cells:

If all the cells in WCDMA_Cell_Set are traversed and finished with the measurement and configuration, then finish measuring and configuring the miss-configured GSM neighbors in these WCDMA cells.

The method for measuring and configuring miss-configured GSM neighbors in WCDMA network according to the embodiment of the present invention successfully solves the problem of measuring miss-configured GSM neighbors. It can find the miss-configured neighbors in time and quickly solve the problem regarding miss-configured neighbors, thus improving efficiency, bettering users' feelings and increasing users' satisfaction. Meanwhile, the system can measure and configure the miss-configured neighbors automatically, avoiding complicated channel tests and CQT tests.

The present embodiments are detailed descriptions of the invention, which is directed for those skilled in the art to understand the invention better. However, those skilled in the art should appreciate that other variations and modifications may be made without departing from the scope and spirit of the claims of the invention. Without exception, they fall within the protection scope of the invention.

What is claimed is:

1. A system for measuring and configuring a miss-configured $2^{nd}$ Generation (2G) neighbor to a user equipment in a $3^{rd}$ Generation (3G) network, comprising: an operation and maintenance center, a radio network controller and a data register, wherein the operation and maintenance center further comprises a measurement information unit, which stores measurement and configuration parameters as well as measurement condition for 2G neighbors in the operation and maintenance center, and forms list of a 3G cell based on the parameters; a configuration unit, which, after information of to-be-measured 2G neighbors of the 3G cell in a to-be-measured 2G neighbor list is delivered to the user equipment for measuring, receives report of measurement information of the to-be-measured 2G neighbors from the user equipment, analyzes the report of the measurement information of the to-be-measured 2G neighbors, determines whether one of the to-be-measured 2G neighbors meets a condition of miss-configuration or not, and if yes, adds the one of the to-be-measured 2G neighbors to the miss-configured 2G neighbor list;

the radio network controller further comprises a measurement control unit which generates the to-be-measured 2G neighbor list, wherein when the measurement condition is met, the measurement control unit delivers the to-be-measured 2G neighbor list to the user equipment for measuring and reporting to the configuration unit according to the requirement of the measurement control unit;

the data register records the report of the measurement information of the to-be-measured 2G neighbor.

2. The system according to claim 1, wherein the 3G network is a WCDMA network.

3. The system according to claim 1, wherein the miss-configured 2G neighbors are miss-configured GSM neighbors.

4. The system according to claim 3, wherein the measurement information reported by the user equipment and recorded by the data register comprises information of the currently resident cell and the reported 2G neighbors as well as signal quality of the 2G neighbors.

5. A method for measuring and configuring a miss-configured 2G neighbor to a user equipment in a 3G network, comprising the following steps:

setting parameters and measuring 2G neighbors in a 3G cell according to the set parameters;

generating a to-be-measured 2G neighbor list and delivering the to-be-measured 2G neighbor list to the user equipment for measuring;

receiving report of measurement information of the 2G neighbors from the user equipment, and when the reported measurement information of one of the to-be-measured 2G neighbors meets a condition of miss-configuration, adding the one of the to-be-measured 2G neighbors to the miss-configured 2G neighbor list.

6. The method according to claim 5, wherein the setting and measuring step comprises the following steps:

(I): determining an area of 3G and 2G cells in the 3G network that needs to be measured and configured;

(II): setting measurement and configuration parameters of the 2G neighbors in the 3G network by a measurement information unit in an operation and maintenance center;

(III): calling a measurement control unit in a radio network controller to measure 2G neighbors for each 3G cell.

7. The method according to claim 5, wherein the generating and delivering step comprises the following step:

(IV): a measurement control unit in a radio network controller generating a to-be-measured 2G neighbor list and delivering the to-be-measured 2G neighbor list to the user equipment.

8. The method according to claim 5, wherein the receiving and adding step comprises the following steps:

(V): the user equipment measuring and reporting, according to requirement of a measurement control unit in a radio network controller, information of the 2G neighbors to a configuration unit in an operation and maintenance center, which processes the information of the 2G neighbors; and (VI): the configuration unit configuring miss-configured 2G neighbors in the 3G cell.

9. The method according to claim 6, wherein step (I) comprises the following steps:

(1) acquiring information of all the 3G cells in the area;

(2) according to an area of 2G neighbors that needs to be optimized in the 3G network cell, determining information of all the 2G cells in the area.

10. The method according to claim 6, wherein the area is a specific 3G cell, a certain geographic area or a certain administrative area.

11. The method according to claim 6, wherein step (II) comprises the following steps:

(1) setting information needed for the user equipment to start measuring 2G neighbors in the 3G network;

(2) setting depth indicating parameters for automatic measurement and configuration;

(3) setting list information of 3G cells whose 2G neighbors need automatic measurement and configuration;

(4) setting condition for the user equipment to measure the 2G neighbors.

12. The method according to claim 11, wherein the condition for the user equipment to measure the 2G neighbors is that the level of 2G is greater than a minimum level of GSM.

13. The method according to claim 7, wherein step (IV) comprises the following steps:

(1) based on the 3G cell where the user equipment currently resides, the radio network controller acquiring the cell's 2G neighbor lists and generating a list set as a list set of 2G neighbors for the user equipment;

(2) if the number of the lists is K and K is not smaller than 32, then finishing measurement and configuration; otherwise, according to a selection and measurement method for the to-be-measured 2G neighbors, selecting, from all the 2G neighbor lists, (32–K) 2G cells different from any one of 2G neighbor lists in the list set as GSM_Neighbor_Add_List_i_j;

(3) the 2G neighbor lists and the GSM_Neighbor_Add_List_i_j constituting 32 to-be-measured 2G neighbor lists from which to-be-measured 2G neighbors are selected and delivered together with corresponding measurement conditions to the user equipment for measuring via the measurement control unit.

14. The method according to claim 13, wherein the selection and measurement method for the to-be-measured 2G neighbors comprises the following steps:

(A): comparing the information of 2G cells with the information of the 2G neighbor lists of the 3G cell where the user equipment resides; in the list set of 2G cells, excluding the information of the 2G neighbor lists of the 3G cell where the user equipment resides and constituting a to-be-measured 2G neighbor queue of the 3G cell where the user equipment resides;

(B): when the user equipment in this cell needs to start measuring 2G neighbors, selecting the first (32–K) neighbors from head of the queue, which, together with the 2G neighbor lists of the 3G cell where the user equipment resides constitute the to-be-measured neighbor lists;

(C): repeating step (2) until all the 2G cells in the 2G neighbor queue are delivered, then finishing delivering 2G neighbors to the user equipment in the 3G cell.

15. The method according to claim 14, wherein step (B) comprises:

(B1) to ensure that the selected to-be-measured 2G neighbors are not repeatedly delivered neighbors, after these (32–K) neighbors are delivered, moving them to the end of the queue; once these neighbors are all traversed and delivered successfully to the user equipment for measuring, adding 1 to the delivery times of 2G cells in the 3G cell.

16. The method according to claim 15, wherein in step (C), the condition for judging whether all 2G cells in the 2G neighbor queue are delivered is that the delivery times reach a depth indicating parameter.

17. The method according to claim 8, wherein step (V) comprises the following steps:

(1) based on measurement control delivered by the measurement control unit in the radio network controller, the user equipment starting measuring signals of the 2G neighbors;

(2) the user equipment uploading measurement reports to the configuration unit in the operation and maintenance center, which records the measurement reports after receiving them or the measurement reports are recorded by a data register.

18. The method according to claim 17, wherein the condition for recording is that if the reported 2G neighbors are not in the present cells, the configuration unit records the information of the 3G cell where the user equipment currently resides and of the reported 2G neighbors; otherwise, no action is needed.

19. The method according to claim 18, wherein the reported information of 2G neighbors is Broadcast Control Channel (BCCH) frequency point number, Base Station Identity Code (BSIC) information, and signal quality of the 2G cells.

20. The method according to claim 8, wherein step (VI) comprises the following steps:

(1) if information of the to-be-measured neighbors of a cell is completely delivered to the user equipment, the measurement control unit in the radio network controller informing the configuration unit in the operation and maintenance center that the information delivery of the cell's neighbors has finished;

(2) the configuration unit collecting all the reported information of the cell; if signal quality of a 2G neighbor exceeds a threshold and the reporting times also exceed a threshold, then it is a proof that the 2G neighbor is a miss-configured neighbor and it will be added to 2G neighbor lists of the 3G cell.

21. The method according to claim 20, wherein the adding of 2G neighbors to the 2G neighbor lists of the 3G cell is either automatic adding by the operation and maintenance center or selective adding by hand.

22. The method according to claim 5, wherein the 3G system is a WCDMA system.

23. The method according to claim 22, wherein the miss-configured 2G neighbors are miss-configured GSM neighbors.

24. An operation and maintenance center for measuring and configuring a miss-configured 2nd Generation (2G) neighbor to a user equipment in a 3rd Generation (3G) network, comprising:

a measurement information unit, which stores measurement and configuration parameters as well as measurement condition for 2G neighbors in the operation and maintenance center, and forms list of a 3G cell based on the parameters; and a configuration unit, which, after information of to-be-measured 2G neighbors of the 3G cell in a to-be-measured 2G neighbor list is delivered to the user equipment for measuring, receives report of measurement information of the to-be-measured 2G neighbors from the user equipment, analyzes the report of the measurement information of the to-be-measured 2G neighbors, determines whether one of the to-be-measured 2G neighbors meets a condition of miss-configuration or not, and if yes, adds the one of the to-be-measured 2G neighbors to the miss-configured 2G neighbor list.

25. A radio network controller for measuring and configuring a miss-configured 2nd Generation (2G) neighbor to a user equipment in a 3rd Generation (3G) network, comprising:

a measurement control unit which generates a to-be-measured 2G neighbor list, and when a measurement condition is met, the measurement control unit delivers the to-be-measured 2G neighbor list to the user equipment for measuring and reporting to a configuration unit of an operation and maintenance center according to the requirement of the measurement control unit;

wherein the generates the to-be-measured 2G neighbor list is as follows:

(1) based on a 3G cell where the user equipment currently resides, acquiring the cell's 2G neighbor lists and generating a list set as a list set of 2G neighbors for the user equipment;

(2) it the number of the lists is K and K is not smaller than 32, then finishing measurement and configuration; otherwise, according to a selection and measurement method for the to-be-measured 2G neighbors, selecting, from all the 2G neighbor lists, (32−K) 2G cells different from any one of 2G neighbor lists in the list set as GSM_Neighbor_Add_List_i_j;

(3) the 2G neighbor lists and the GSM_Neighbor_Add_List_i_j constituting 32 to-be-measured 2G neighbor lists from which to-be-measured 2G neighbors are selected and delivered together with corresponding measurement conditions to the user equipment for measuring via the measurement control unit.

* * * * *

UNITED STATES PATENT AND TRADEMARK OFFICE
CERTIFICATE OF CORRECTION

PATENT NO.       : 7,657,283 B2                                  Page 1 of 1
APPLICATION NO. : 11/601339
DATED            : February 2, 2010
INVENTOR(S)      : Jianyong Cai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Twenty-eighth Day of December, 2010

David J. Kappos
*Director of the United States Patent and Trademark Office*